(12) United States Patent
Stafford et al.

(10) Patent No.: US 8,325,086 B2
(45) Date of Patent: Dec. 4, 2012

(54) METHODS AND SYSTEMS TO DIMINISH FALSE-ALARM RATES IN MULTI-HYPOTHESIS SIGNAL DETECTION THROUGH COMBINATORIC NAVIGATION

(75) Inventors: Stephen J. Stafford, Derwood, MD (US); Mark S. Asher, Ellicott City, MD (US); Martin G. Sommerville, Columbia, MD (US); Lloyd A. Linstrom, Columbia, MD (US); Thomas L. Kusterer, Elkridge, MD (US)

(73) Assignee: The Johns Hopkins University, Baltimore, MD (US)

( * ) Notice: Subject to any disclaimer, the term of this patent is extended or adjusted under 35 U.S.C. 154(b) by 136 days.

(21) Appl. No.: 12/767,158

(22) Filed: Apr. 26, 2010

(65) Prior Publication Data
US 2010/0271259 A1 Oct. 28, 2010

Related U.S. Application Data

(60) Provisional application No. 61/172,267, filed on Apr. 24, 2009.

(51) Int. Cl.
*G01S 19/42* (2010.01)
*G01S 19/38* (2010.01)
(52) U.S. Cl. .............................. 342/357.25; 342/357.21
(58) Field of Classification Search ............... 342/357.2, 342/357.25, 357.46, 357.58, 357.67, 357.21; 701/213, 215, 468, 469
See application file for complete search history.

(56) References Cited

U.S. PATENT DOCUMENTS

| | | |
|---|---|---|
| 6,407,699 B1 | 6/2002 | Yang |
| 6,516,021 B1 | 2/2003 | Abbott et al. |
| 6,563,461 B1 | 5/2003 | Elgersma et al. |
| 6,798,377 B1 | 9/2004 | Lupash et al. |
| 6,944,541 B2 | 9/2005 | Pasturel et al. |
| 7,161,532 B2 | 1/2007 | Gomm |
| 7,446,706 B2 | 11/2008 | Riley et al. |
| 7,548,199 B2 | 6/2009 | Winternitz et al. |
| 7,623,066 B2 | 11/2009 | Geier et al. |
| 7,623,070 B2 | 11/2009 | Roh |
| 2006/0082496 A1* | 4/2006 | Winternitz et al. ...... 342/357.06 |
| 2008/0180315 A1 | 7/2008 | Tarlow et al. |
| 2009/0219202 A1 | 9/2009 | Pon |
| 2010/0117884 A1* | 5/2010 | Ahmed et al. .................. 342/14 |

* cited by examiner

*Primary Examiner* — Dao Phan
(74) *Attorney, Agent, or Firm* — Noah J. Hayward

(57) ABSTRACT

Methods and systems to detect navigation signals, including to identify up to multiple range-Doppler hypotheses from each of j range-Doppler correlation grids based on a relatively low first threshold, generate navigation solutions from combinatorial sets of k of the identified hypotheses, evaluate the navigation solutions to identify plausible solutions, iteratively and combinatorially augment the plausible solutions with additional hypotheses from grids that are not represented in the corresponding k-hypotheses based navigation solutions, replace plausible solutions with corresponding augmented plausible solutions when appropriate, and select one of a plurality of plausible solutions as a best plausible solution, j and k being positive integers. Where a grid energy peak exceeds a second threshold, a corresponding hypothesis may be identified as a sole hypothesis for the corresponding navigation signal. The relatively low first threshold permits detection of weaker signals. Subsequent evaluations effectively transform a per-navigation-signal false alarm rate to per-navigation-solution false alarm rate.

20 Claims, 11 Drawing Sheets

METHODS AND SYSTEMS TO DIMINISH FALSE-ALARM RATES IN MULTI-HYPOTHESIS SIGNAL DETECTION THROUGH COMBINATORIC NAVIGATION

CROSS REFERENCE TO RELATED APPLICATIONS

This application claims the benefit of U.S. Provisional Patent Application No. 61/172,267, filed on Apr. 24, 2009, which is incorporated herein by reference in its entirety.

STATEMENT OF GOVERNMENTAL INTEREST

This invention was made with U.S. Government support under contract number 2004-H009000-000. The U.S. Government has certain rights in the invention.

BACKGROUND

1. Technical Field

Methods and systems are disclosed herein related to detection of navigation signals based on correlations amongst the navigation signals, and to computation of a navigation solution from the detected navigation signals.

2. Related Art

In satellite-based navigation, a navigation solution is computed from navigation signals received from multiple navigation satellites. A received navigation signal may have a relatively low signal to noise ratio, which may make it difficult to distinguish the signal from noise. Additionally, motion of a receiver or a satellite may impart a Doppler frequency shift to the signal. Atmospheric and/or other environmental conditions may impart propagation delay to the signal. These issues may impact detection accuracy of the navigation signal, which may impact accuracy of a navigation solution.

In a deep-fade global navigation satellite system (GNSS), such as a global positioning system (GPS), signals received from navigation satellites may be detected along two dimensions: delay (or range), and frequency (or Doppler shift). For each received signal, correlation energies of various range-Doppler hypotheses may be calculated and assembled into a range-Doppler correlation grid.

A navigation signal may be detected from a range-Doppler correlation grid by identifying the range-Doppler hypothesis having the highest grid energy, and comparing the highest grid energy to a threshold. The threshold may be set sufficiently high to minimize false alarms. If the maximum grid energy is greater than the threshold, the corresponding range-Doppler hypothesis may be considered valid. Navigation signals received from other satellites may be detected in a similar fashion. Where a range-Doppler hypothesis greater than the threshold is identified from each of multiple range-Doppler correlation grids, a navigation solution may be calculated using a least-squares method.

As described above, each of the multiple signals is individually detected based on a relatively high per signal threshold. This may preclude detection of a signal from one or more satellites, which may reduce the accuracy of a navigation solution or preclude determination of a navigation solution.

SUMMARY

Disclosed herein are methods and systems to detect multiple navigation signals based on correlations performed across the multiple navigation signals.

A range-Doppler correlation grid may be generated for each of multiple received navigation signals. Energy peaks of the grids may be compared to a relatively low first threshold to identify up to multiple range-Doppler hypotheses per grid. The first threshold may be less than a conventional per-signal or per-grid false alarm threshold.

The relatively low signal detection threshold permits detection of weaker signals. Subsequent evaluations to identify plausible and a most plausible navigation solution effectively transform a per-navigation-signal false alarm rate to per-navigation-solution false alarm rate.

Where a grid energy peak exceeds a second threshold that is higher than the first threshold, a corresponding hypothesis may be identified as a sole hypothesis for the corresponding navigation signal.

At least one hypothesis may be identified from each of j grids, where j may be less than a total number of received navigation signals.

Multiple navigation solutions may be computed from corresponding sets of identified hypotheses, each set including one hypothesis from each of k of the j grids, where k is less than or equal to j. The sets of k-hypotheses may be generated combinatorially to cover all or substantially all possible combinations of k identified hypotheses.

The k-hypotheses-based navigation solutions may be evaluated to identify one or more plausible navigation solutions. The evaluations may include determining an integrity measure with respect to each of the navigation solutions.

Where hypotheses are identified from more than k of the range-Doppler correlation grids (where j is greater than k), a k-hypotheses-based plausible navigation solution may be iteratively augmented and evaluated with respect to hypotheses of grids not represented in the k-hypotheses-based plausible navigation solution. The k-hypotheses-based plausible navigation solution may be replaced with the augmented navigation solution based on the corresponding evaluations, and the iterative augmentation and evaluation may continue with respect to the augmented navigation solution. Augmentation and testing may be performed with respect to each k-hypotheses-based plausible navigation solution, and may be performed with respect to all or substantially all possible combinations of hypotheses of corresponding unrepresented grids.

Where multiple plausible navigation solutions are identified, a most plausible navigation solution may be selected based on the corresponding evaluations.

Methods and systems disclosed herein may be referred to herein as vector acquisition methods and systems.

Methods and systems disclosed herein may be implemented to simultaneously detect a set of navigation signals, and to simultaneously determine the set of navigation signals and a corresponding navigation solution.

Methods and systems disclosed herein, and/or portions thereof, may be implemented, for example, in relatively weak-signal and/or fade-prone environments, such as a deep-fade GNSS signal acquisition environment, which may include cellular telephone based navigation environments and automobile-based navigation environments.

BRIEF DESCRIPTION OF THE DRAWINGS/FIGURES

Figure 1:
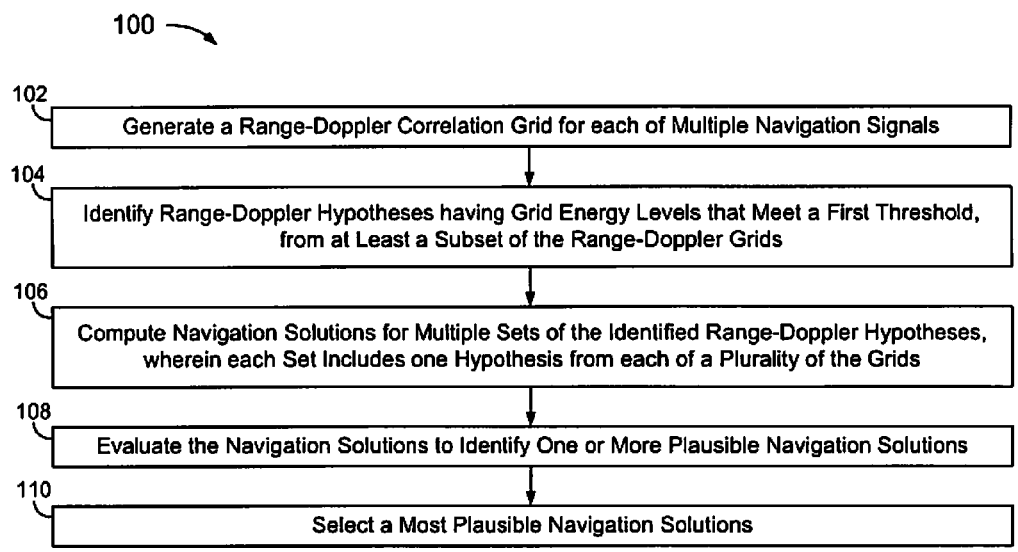
FIG. 1 is a flowchart of a method of detecting navigation signals based on correlations amongst the navigation signals, and computing a navigation solution from the detected navigation signals.

In the drawings, the leftmost digit(s) of a reference number identifies the drawing in which the reference number first appears.

DETAILED DESCRIPTION

FIG. 1 is a flowchart of a method 100 of detecting navigation signals based on correlations amongst the navigation signals, and computing a navigation solution from the detected navigation signals.

At 102, a range-Doppler correlation grid is generated for each of multiple navigation signals, to map energies of the signals with respect to potential delay times, or ranges, and with respect to potential Doppler shifts.

Figure 2:
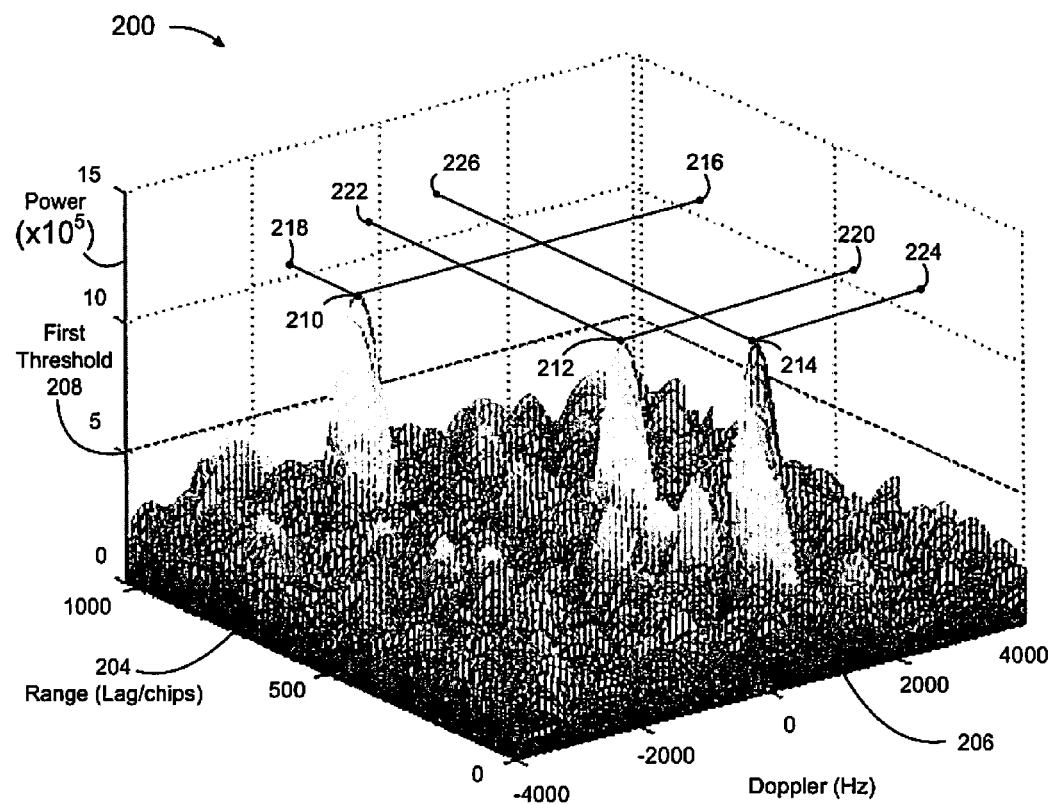
FIG. 2 is a graphic depiction of a range-Doppler correlation grid including a first energy threshold to identify range-Doppler hypotheses from grid energy peaks.

FIG. 2 is a graphic depiction of an example range-Doppler correlation grid 200, wherein energy of a received signal is mapped with respect to a range axis 204 and a Doppler axis 206. Range axis 204 may represent pseudo random code chips (PRN code chips). Doppler axis 206 may represent a residual Doppler frequency.

Range and Doppler values of a point within grid 200 represent a potential time delay and Doppler shift of the signal, respectively, and are referred to herein as a range-Doppler hypothesis of the signal.

At 104 in FIG. 1, range-Doppler hypotheses having grid energy levels that meet a first threshold are identified from at least a subset of the range-Doppler grids. A range-Doppler correlation grid may include zero or more energy peaks that meet the first threshold.

In FIG. 2, grid 200 includes energy peaks 210, 212, and 214. Coordinate sets 216 and 218, 220 and 222, and 224 and 226, identify range, Doppler, and energy values of corresponding peaks 210, 212, and 214. The range and Doppler values represent corresponding range-Doppler hypotheses of the energy peaks.

In FIG. 2, a first energy threshold 208 is substantially below typical energy levels of peaks 210, 212, and 214.

In FIG. 1, the identifying at 104 may include identifying only one range-Doppler hypothesis from a range-Doppler correlation grid when the energy level of the one range-Doppler hypothesis meets a second threshold that is greater than the first threshold, such as described below with respect to FIG. 3.

Figure 3:
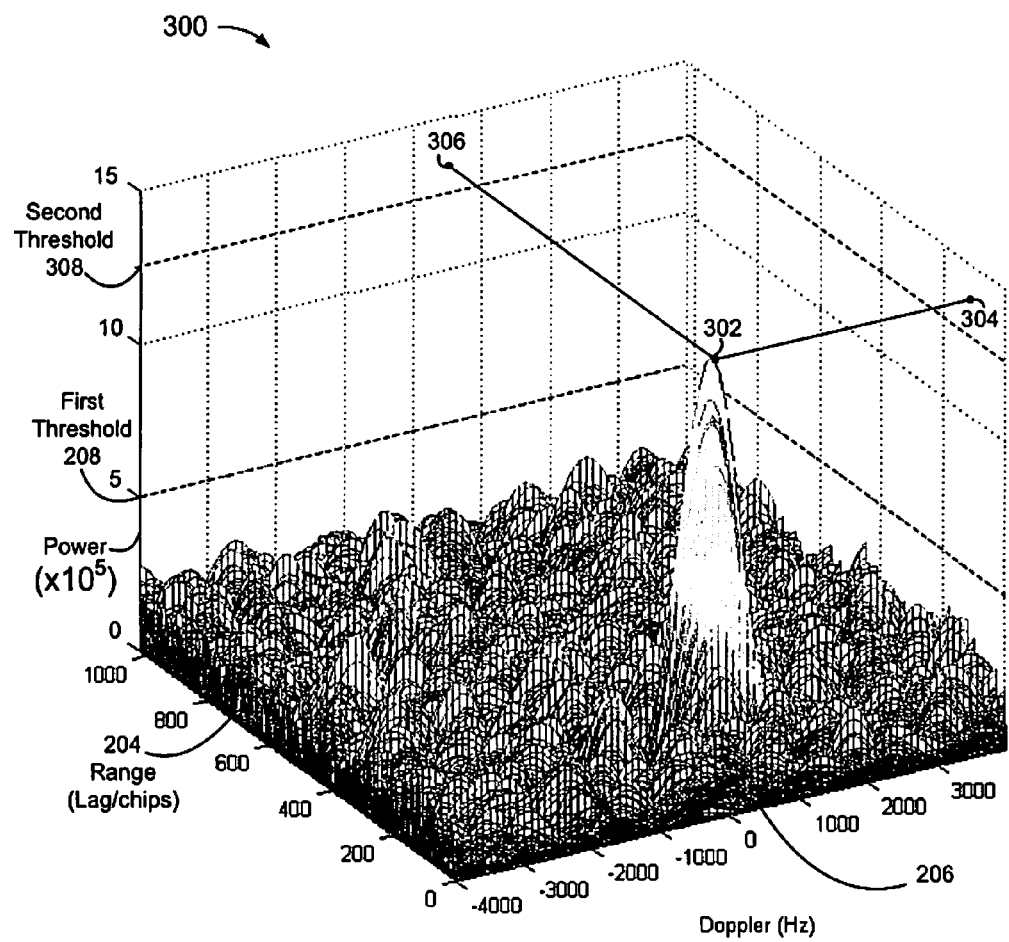
FIG. 3 is a graphic depiction of another range-Doppler correlation grid including a second energy threshold to identify a single range-Doppler hypothesis from the grid.

FIG. 3 is a graphic depiction of a range-Doppler correlation grid 300, including first threshold 208 and a second threshold 308. Grid 300 further includes an energy peak 302. Coordinates 306 and 308 illustrate range, Doppler, and energy values of peak 302. Since the grid energy of energy peak 302 is greater than second threshold 308, a range-Doppler hypothesis corresponding to energy peak 302 may be identified as the sole range-Doppler hypothesis of grid 300.

Where multiple energy peaks exceed second threshold 308, second threshold 308 may be ignored and all energy peaks that meet first threshold 208 may be identified at 104. Alternatively, a highest one of the peaks may be identified at 104.

At 106 of FIG. 1, navigation solutions are computed for multiple sets of the identified range-Doppler hypotheses, wherein each set includes one hypothesis from each of a plurality of grids. The navigation solutions may be computed in accordance with a least-squares technique.

At 108, the navigation solutions are evaluated to identify one or more plausible navigation solutions.

The evaluating at 108 may include evaluating a reasonableness of a navigation solution. Reasonableness may be evaluated with respect to one or more of, a residual of the navigation solution, measurements associated the navigation solution, such as range, pseudo-range, and Doppler measurements, and states associated with the navigation solution, such as position, velocity, and clock error. Example evaluation techniques are disclosed further below.

Where multiple plausible navigation solutions are identified at 108, a most plausible one of the plausible navigation solutions may be selected at 110.

The most plausible navigation solution may be output, such as to a system, which may include one or more of a display, a computational system, a communication system, and a storage system. The most plausible navigation solution may be utilized for one or more of location/position determination, tracking, and guidance.

Navigation solutions may be computed from k range-Doppler hypotheses corresponding to k navigation signals, wherein k is a positive integer. k may represent a minimum or desired number of navigation signals to compute a navigation solution, and may be equal to, for example and without limitation 4, 5, or 6, as is well known. For a GPS application, k may be equal to 5. Where elevation is known, k may be equal to four. Methods and systems disclosed herein are not, however, limited to these examples.

A number of j range-Doppler correlation grids for which an energy peak exceeds the first threshold, may be equal to or greater than k, such as illustrated below with respect FIG. 6.

Figure 4:
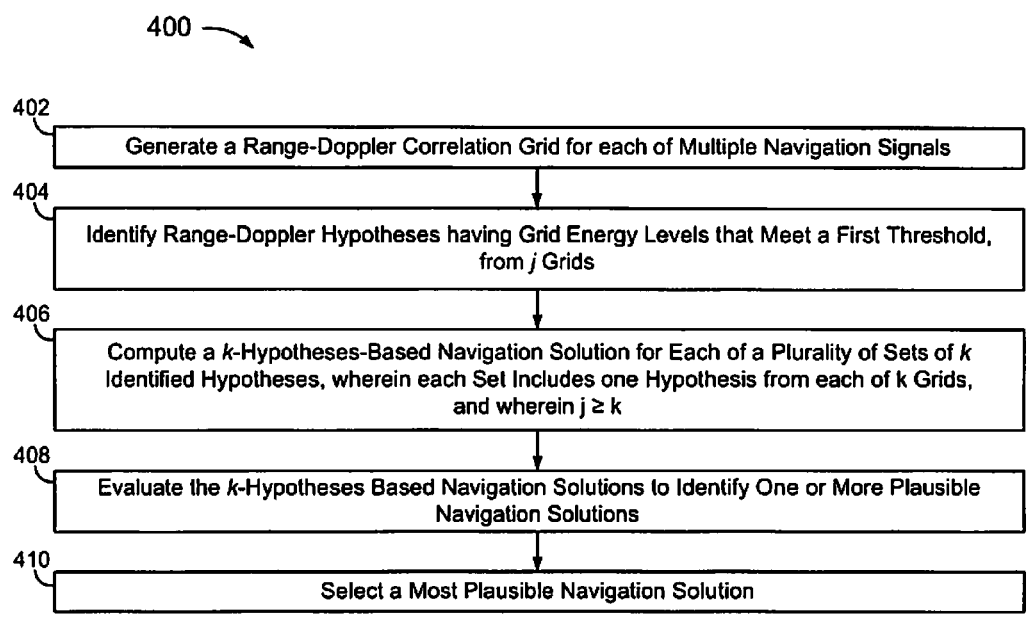
FIG. 4 is a flowchart of a method of generating k-hypotheses-based navigation solutions from j range-Doppler correlation grids, wherein j≧k.
Figure 5:
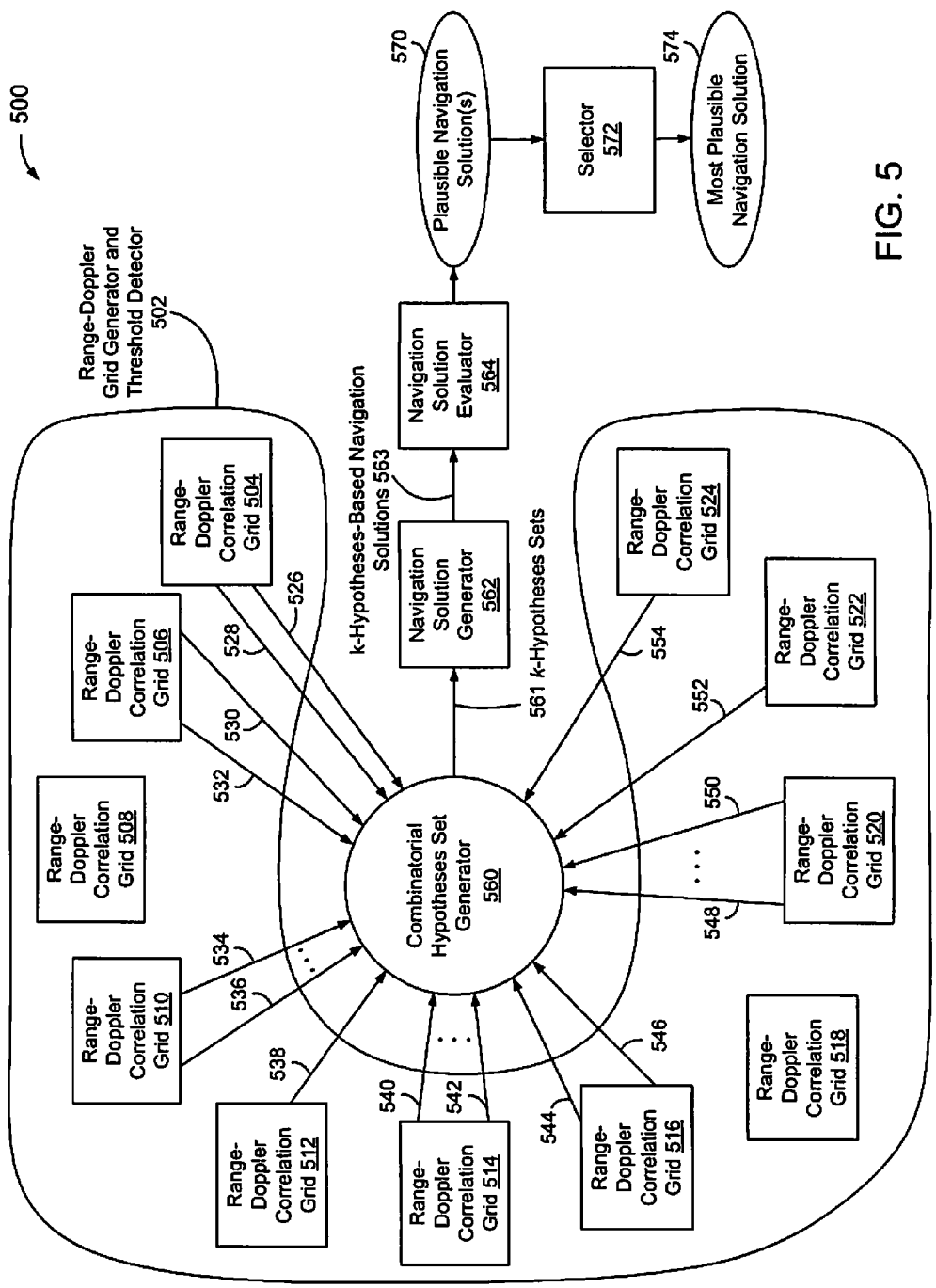
FIG. 5 is a block diagram of a system to generate k-hypotheses-based navigation solutions from j range-Doppler correlation grids, wherein j≧k.

FIG. 4 is a flowchart of a method 400 of generating k-hypotheses-based navigation solutions from j range-Doppler correlation grids, wherein j≧k. FIG. 5 is a block diagram of a system 500 to generate k-hypotheses-based navigation solutions from j range-Doppler correlation grids. Method 400 is described below with respect to system 500. Method 400 is not, however, limited to the example of system 500.

At 402, a range-Doppler correlation grid is generated for each of multiple navigation signals.

At 404, range-Doppler hypotheses having grid energies that meet a first threshold are identified from j of the range-Doppler grids.

In FIG. 5, system 500 includes a range-Doppler correlation grid generator and threshold detector 502 to generate range-Doppler correlation grids from corresponding received navigation signals, and to identify energy peaks that meet the first threshold. Where a range-Doppler correlation grid does not include an energy peek that meets the first threshold, no hypothesis is output by grid generator and threshold detector 502.

FIG. 5 includes eleven range-Doppler correlation grids, 504 through 524, each generated from a corresponding received navigation signal. Grid generator and threshold detector 502 may generate other numbers of grids depending upon a number of received navigation signals.

In FIG. 5, identified range-Doppler hypotheses include hypotheses 526 through 554, including one hypothesis from each of grids 512, 522, and 524, and multiple hypotheses from each of grids 504, 506, 510, 514, 516, and 520. No hypotheses are identified from grids 508 and 518.

In the example of FIG. 5, hypotheses are identified from eight of the eleven grids and j=8.

At 406, a k-hypothesis based navigation solution is computed for each of a plurality of sets of k identified hypothesis. The sets of k-hypotheses may be selected so that no set includes more than one hypothesis from a grid. An example is provided below for with respect to FIG. 6, for k=5.

In FIG. 5, system 500 includes a combinatorial hypothesis set generator 560 to generate multiple sets 561 of various combinations of k hypotheses.

System 500 further includes a navigation solution generator 562 to compute a k-hypothesis-based navigation solution 563 for each set 561 of k-hypotheses.

At 408 in FIG. 4, the k-hypotheses-based navigation solutions are evaluated to identify one or more k-hypotheses-based plausible navigation solutions.

In FIG. 5, system 500 includes a navigation solution evaluator 564 to evaluate the k-hypotheses-based plausible navigation solutions 563, and to identify one or more of the k-hypotheses-based plausible navigation solutions 563 as plausible navigation solutions 570.

Where multiple plausible k-hypotheses-based navigation solutions are identified at 408, a most plausible one of the k-hypotheses-based plausible navigation solutions may be selected at 410. Alternatively, one or more k-hypotheses-based plausible navigation solutions may be further processed and evaluated, such as described below with respect to FIGS. 7, 8, and 9.

In FIG. 5, system 500 includes a selector 572 to select a most plausible navigation solution 574.

Figure 6:
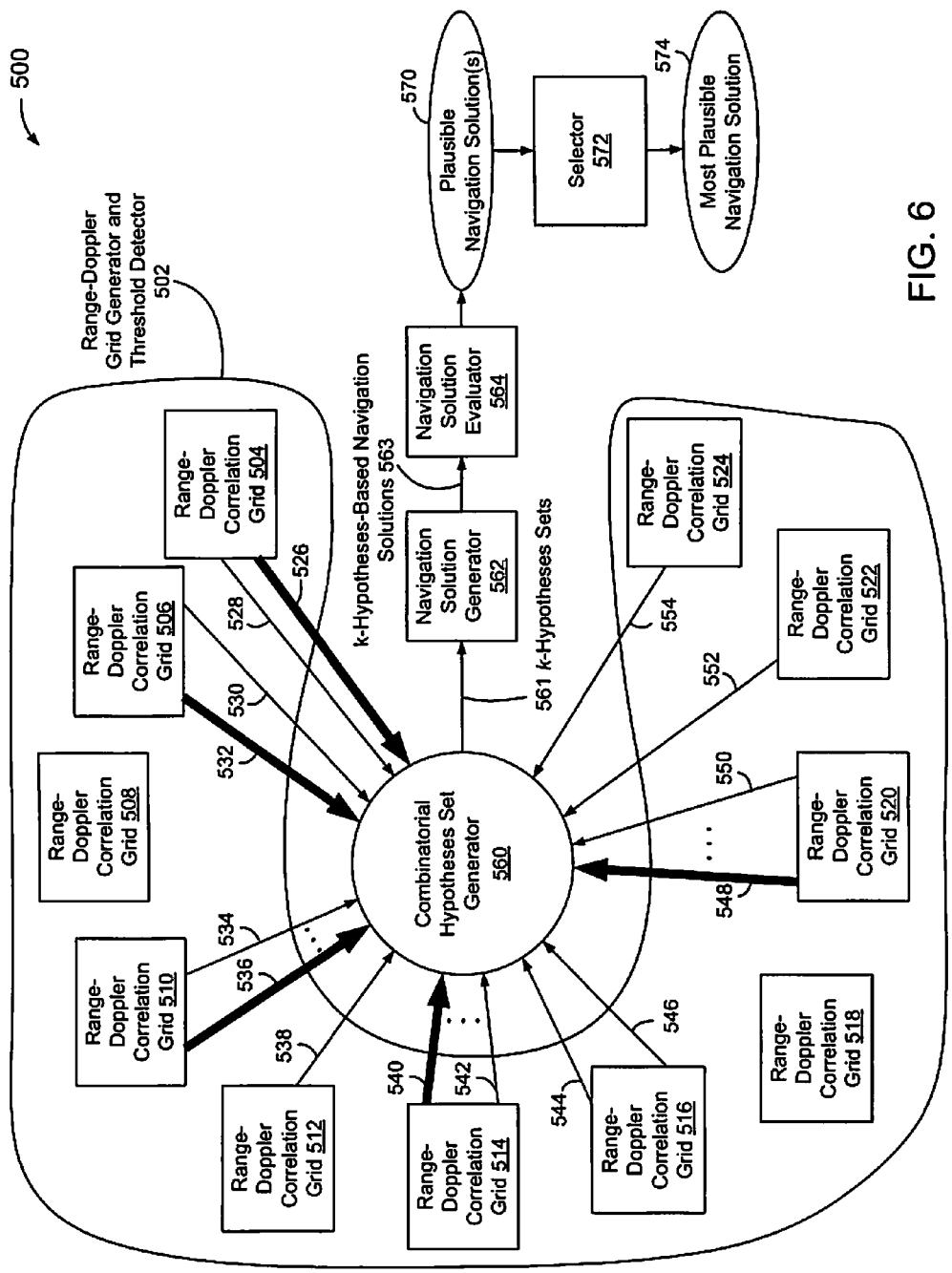
FIG. 6 is a block diagram of the system of FIG. 5, including a highlighted set of k=5 range-Doppler hypotheses.

FIG. 6 is a block diagram of system 500, wherein hypotheses 526, 532, 536, 540, and 548 are highlighted to represent a set 561 of k=5 hypotheses.

Where more than k grids have an energy peak that exceeds the first threshold (i.e., j>k), such as in FIG. 6, a k-hypotheses-based plausible navigation solution 570 may be augmented and tested with one or more additional hypotheses selected from one or more of the j grids that are not represented within the plausible navigation solution 570. For example, where a plausible navigation solution is computed from highlighted hypotheses 526, 532, 536, 540, and 548, the navigation solution may be augmented and tested hypotheses from grids 512, 516, 522, and 524, such as described below with respect to FIGS. 7, 8, and 9.

Figure 7:
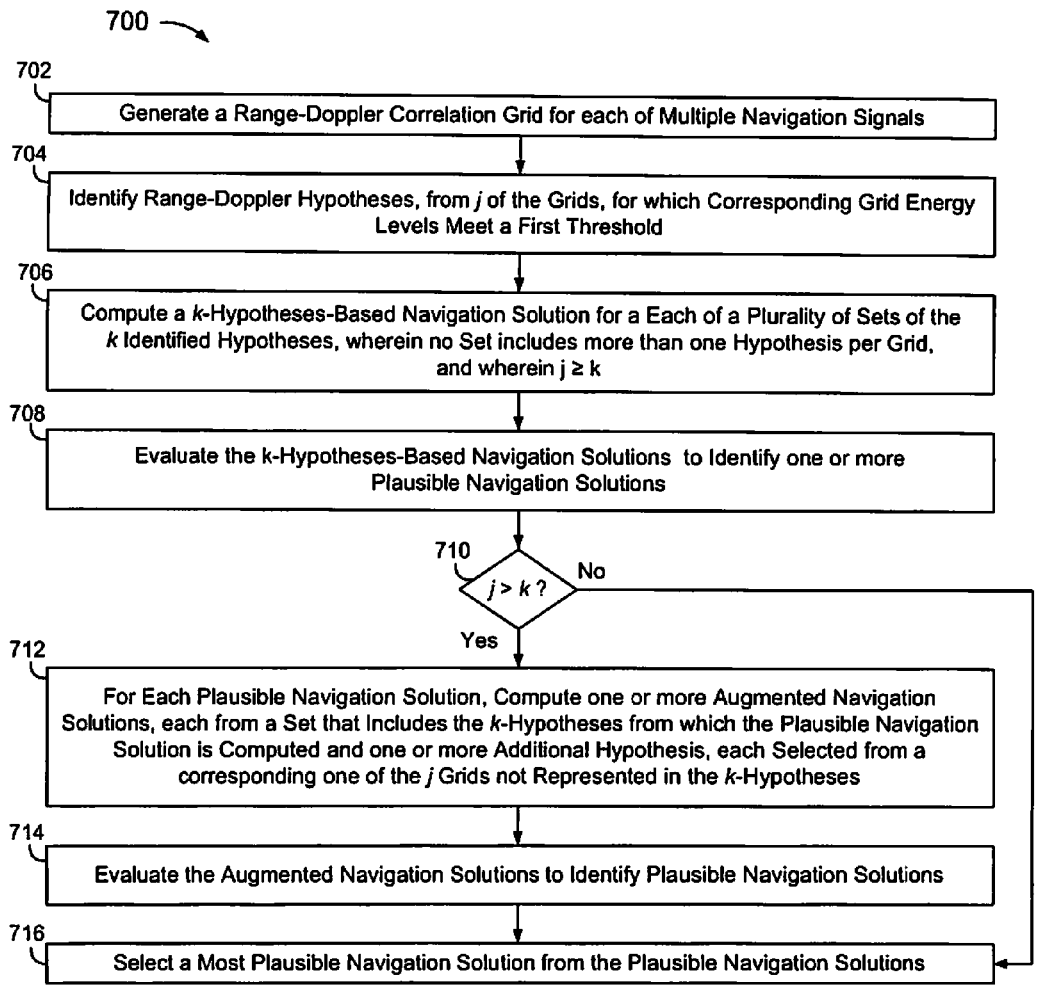
FIG. 7 is a flowchart of a method of generating k-hypotheses-based plausible navigation solutions, and of augmenting the plausible navigation solutions with hypotheses of grids not represented in the corresponding navigation solutions.

FIG. 7 is a flowchart of a method 700 of generating k-hypotheses-based plausible navigation solutions, and of augmenting the plausible navigation solutions with hypotheses of grids not represented in the corresponding navigation solutions.

Figure 8:
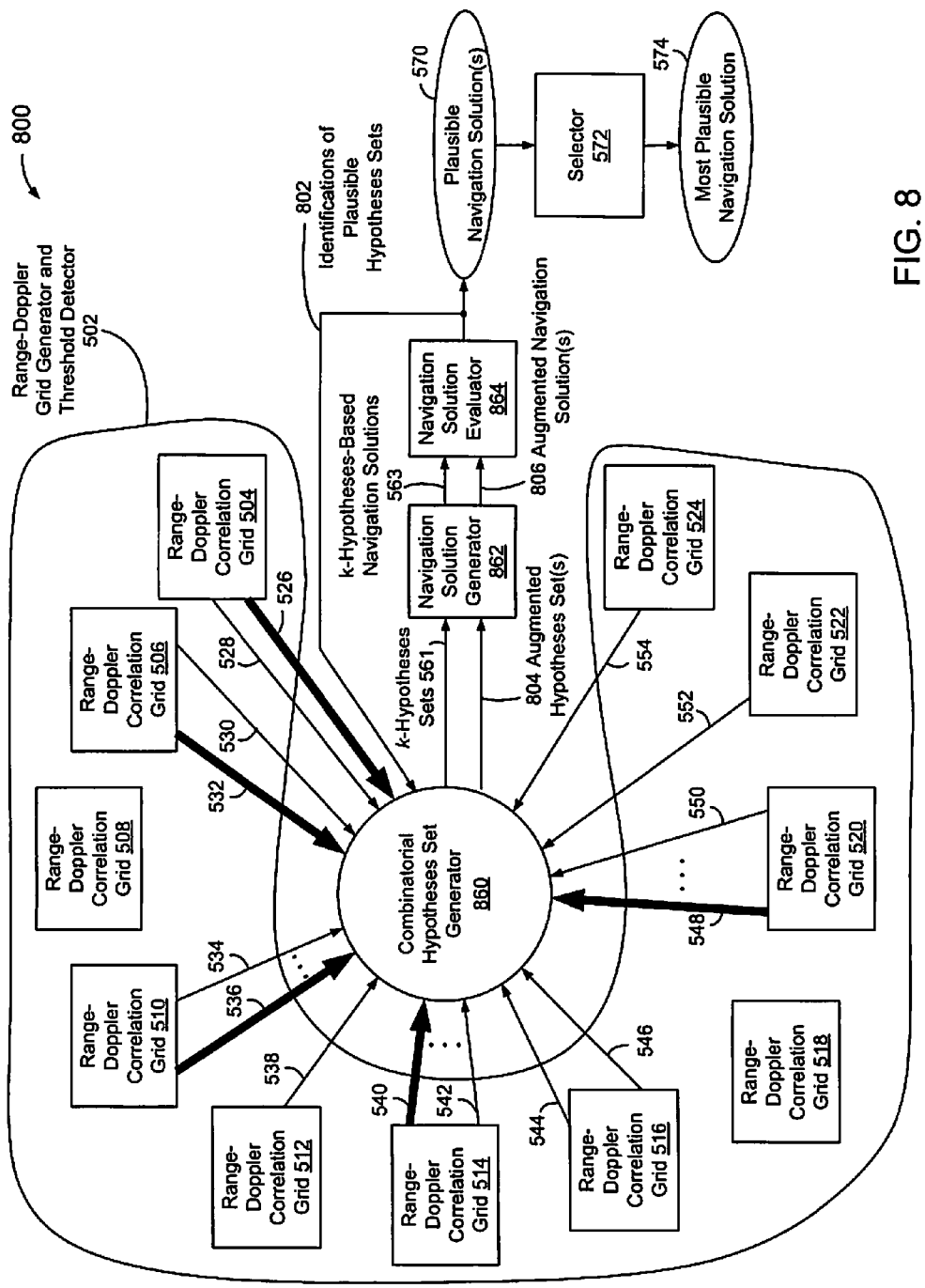
FIG. 8 is a block diagram of a system to generate k-hypotheses-based plausible navigation solutions, and to augment the plausible solutions with hypotheses of grids not represented in the corresponding navigation solutions.

FIG. 8 is a block diagram of a system 800 to generate k-hypotheses-based plausible navigation solutions, and to augment the plausible navigation solutions with hypotheses of grids not represented in the corresponding navigation solutions.

System 800 includes range-Doppler grid generator and threshold detector 502 and selector 572, described above with respect to FIGS. 5 and 6. System 800 further includes a combinatorial hypotheses set generator 860, a navigation solution generator 862, and a navigation solution evaluator 864, which may be configured to perform functions described above with respect to elements 560, 562, and 564, respectively, in FIGS. 5 and 6, and to perform additional functions described below.

Method 700 is described below with respect to system 800. Method 700 is not, however, limited to the example of system 800.

At 702 through 708 of FIG. 7, one or more k-hypothesis-based navigation solutions are identified as plausible navigation solutions, such as described above with respect to 402 through 408 in FIG. 4.

At 710, where j is not greater than k, and where multiple plausible k-hypotheses-based navigation solutions are identified at 708, processing proceeds to 716, described below.

Where j is greater than k, such as illustrated in FIG. 6, processing proceeds to 712.

At 712, for each plausible navigation solution, one or more augmented navigation solutions are computed, each from a set that includes the k-hypotheses from which the plausible navigation solution is computed, and one or more additional hypotheses, each selected from one of the j grids not represented in the k-hypotheses.

Where a grid includes multiple identified hypotheses, multiple corresponding augmented navigation solutions may be computed, one for each of the identified hypotheses.

The computing of an augmented navigation solution at 712 may be performed for each j grid not represented in the corresponding plausible navigation solution.

An augmented navigation solution may be computed from another augmented navigation solution.

Augmented navigation solutions may be computed from all or substantially all potential combinations of identified hypotheses valid for a given plausible navigation solution.

Augmented navigation solutions may be computed iteratively, such as disclosed below with respect to FIG. 9.

At 714, the augmented navigation solutions are evaluated to identify plausible navigation solutions.

At 716, a most plausible navigation solution is selected from the plausible navigation solutions. The identification at 716 may be based on corresponding evaluations.

In FIG. 8, at the outset of 712, plausible navigation solution 570 may include a k-hypotheses-based navigation solution computed from highlighted hypotheses 532, 536, 540, and 548.

In accordance with 712 of FIG. 7, navigation solution evaluator 864 may provide an indication 802 of the highlighted hypotheses to combinatorial hypotheses set generator 860.

Combinatorial hypotheses set generator 860 may generate an augmented hypotheses set 804, including the highlighted hypotheses and one or more identified hypotheses from one or more of grids 512, 516, 522, and 524.

Navigation solution generator 862 may compute an augmented navigation solution 806 from augmented hypotheses set 804.

One or more additional augmented navigation solutions 806 may be generated from the highlighted hypotheses and/or from one or more other sets of k-hypotheses.

In accordance with 714 of FIG. 7, navigation solution evaluator 864 may evaluate augmented navigation solutions 806 to identify plausible navigation solutions.

System 800 may perform the above described process with respect to all or substantially all plausible k-hypotheses-based navigation solutions 570, and may augmented navigation solutions iteratively, such as disclosed below with respect to FIG. 9.

Upon conclusion of the augmentation evaluations, plausible navigation solutions 570 may include one or more k-hypothesis-based navigations and/or augmented navigation solutions.

At 716 of FIG. 7, a most plausible navigation solution 574 may be selected from amongst plausible navigation solutions 570.

Figure 9:
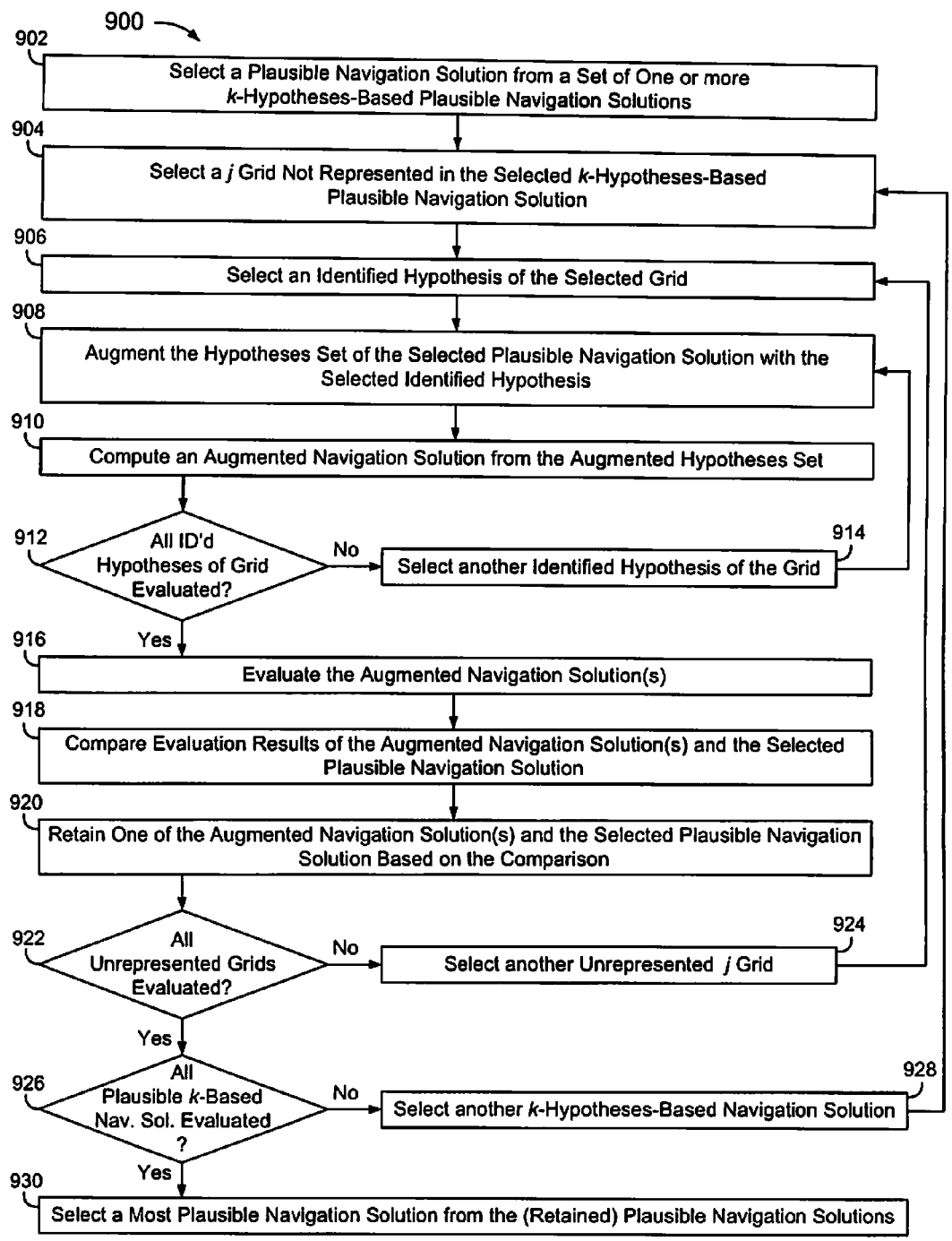
FIG. 9 is a flowchart of a method of iteratively augmenting and evaluating plausible navigation solutions.

FIG. 9 is a flowchart of a method 900 of iteratively augmenting and evaluating plausible navigation solutions. Method 900 is described below with respect to system 800. Method 900 is not, however, limited to the example of system 800.

At 902, a plausible navigation solution is selected from a set of one or more k-hypotheses-based navigation solutions. The set of one or more k-hypotheses-based navigation solutions may be generated such as described above with respect to 702 through 708 in FIG. 7. The selected plausible navigation solution may correspond to a k-hypotheses-based plausible navigation solution 570 generated from a set 561 of hypotheses. For example, hypotheses 526, 532, 536, 540, and 548, such as described above with respect to FIG. 8.

At 904, a j grid that is not represented in the selected plausible navigation solution is selected. In FIG. 8, one of grids 512, 516, 522, and 524 may be selected.

At 906, an identified hypothesis is selected from the selected grid. In FIG. 8, where grid 516 is selected at 904, hypotheses 544 may be selected at 906.

At 908, the hypotheses set of the navigation solution selected at 902 is augmented with the hypothesis selected at 906. In the current example, the set of hypotheses 526, 532, 536, 540, and 548, may be augmented with hypothesis 544.

At 910, an augmented navigation solution is computed from the augmented hypotheses set.

At 912, if the grid selected at 904 has multiple identified hypotheses, another hypothesis is selected at 914, and processing returns 908. In FIG. 8, hypothesis 546 may be selected at 914.

When all identified hypotheses of the selected grid have been processed, processing proceeds from 912 to 916.

At 916, the augmented navigation solution computed at 910, and any additional augmented navigation solutions computed in subsequent iterations of 914 through 910, are evaluated.

At 918, evaluation results of the one or more augmented navigation solutions for grid selected at 904 are compared with evaluation results of the plausible navigation solution selected at 902.

At 920, one navigation solution is retained from amongst the one or more augmented navigation solutions evaluated at 916 and the plausible navigation solution selected at 902, based on the comparison at 918.

At 922, if multiple of the j grids are not represented in the k-hypotheses plausible navigation solution selected at 902, another grid is selected at 924, and processing returns to 906.

When all unrepresented grids of the navigation solution selected at 902 have been processed, processing proceeds from 922 to 926.

At 926, where there are multiple k-hypotheses-based navigation solutions, another plausible k-hypotheses-based navigation solution is selected at 928, and processing returns to 904.

When all k-hypotheses-based navigation solutions have been processed, processing proceeds from 926 to 930.

At 930, a most plausible navigation may be selected from the retained plausible navigation solutions.

Example methods of evaluating a navigation solution are now disclosed.

Evaluation of a navigation solution may include vetting one or more parameters. An example parameterization is provided below.

Let $\tilde{y}$ represent a stacked vector of measurements, which may include, without limitation, range, pseudo-range, and Doppler measurements.

Let $\tilde{x}$ represent a stacked vector of navigation states. Navigation states may include, for example and without limitation, one or more of position, velocity, and clock error.

Let $\Sigma$ represent a covariance matrix corresponding to measurements $\tilde{y}$.

Let H represent a sensitivity matrix used in a least-squares fit process at convergence. The sensitivity matrix may be a Jacobian matrix to represent a sensitivity of the measurements $\tilde{y}$ to the navigation states $\tilde{x}$. The sensitivity matrix may be represented as:

$$\tilde{x} = \frac{\partial(measurements)}{\partial(navigation states)}.$$

An iterative least-squares algorithm may be used to solve for $\tilde{x}$.

If state $\tilde{x}$ is regarded as fixed but unknown, a covariance of the navigation states at convergence may be represented as:

$$cov(\tilde{x})=(H^t\Sigma^{-1}H)^{-1}$$

A measurement error vector, y, may be represented as $\tilde{y}$ minus the estimated measurements at convergence. At convergence, this may be zero mean, with covariance given by:

$$cov(y)=\Sigma_y=\Sigma-H(H^t\Sigma^{-1}H)^{-1}H^t.$$

The matrix may be singular with a number of non-zero eigenvalues given by p=n−m, where n is the total number of the measurements and m is the total number of states estimated. By setting k such that a navigation solution is over determined, p may be greater than 0.

A reasonableness of a navigation solution may be determined by determining whether the measurement vector is consistent with its assumed covariance, such as by application of a chi-squared test to the measurement vector projected into a non-degenerate subspace of $\Sigma_y$.

The covariance of the measurement vector at convergence may first be factored by a singular value decomposition:

$$\Sigma_y=USV^T,$$

where S is diagonal and U=V (since $\Sigma y$ is symmetric) are orthogonal.

There may be p singular values that are not small in the factorization. The singular values may be assumed to be sorted and U=V to have been permuted so that the non-zero singular values will occur at the beginning (upper left) of the main diagonal. The measurement vector at convergence may be transformed to eigen-coordinates:

$$q = U^t y.$$

A test statistic:

$$z = \sum_{i=1}^{p} \frac{q_i^2}{S_{ii}}$$

may be computed, which is chi-squared distributed with p degrees of freedom.

An expected value and standard deviation of z may be determined as:

$$E(z) = p$$

$$\mathrm{std}(z) = \sqrt{2p}.$$

A measure of navigation solution integrity may be determined as:

$$\left| \frac{z-p}{\sqrt{2p}} \right|.$$

If the test statistic corresponding to a navigation solution is relatively much larger than the expected value compared to its standard deviation, the navigation solution may be deemed invalid and may be discarded.

Alternatively, or additionally, a navigation solution may be evaluated with respect to positional dilution of precision (PDOP) test.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or combination of integrated circuit packages. The term software, as used herein, refers to a computer program product including a computer readable medium having computer program logic stored therein to cause a computer system to perform one or more functions in response thereto.

Figure 10:
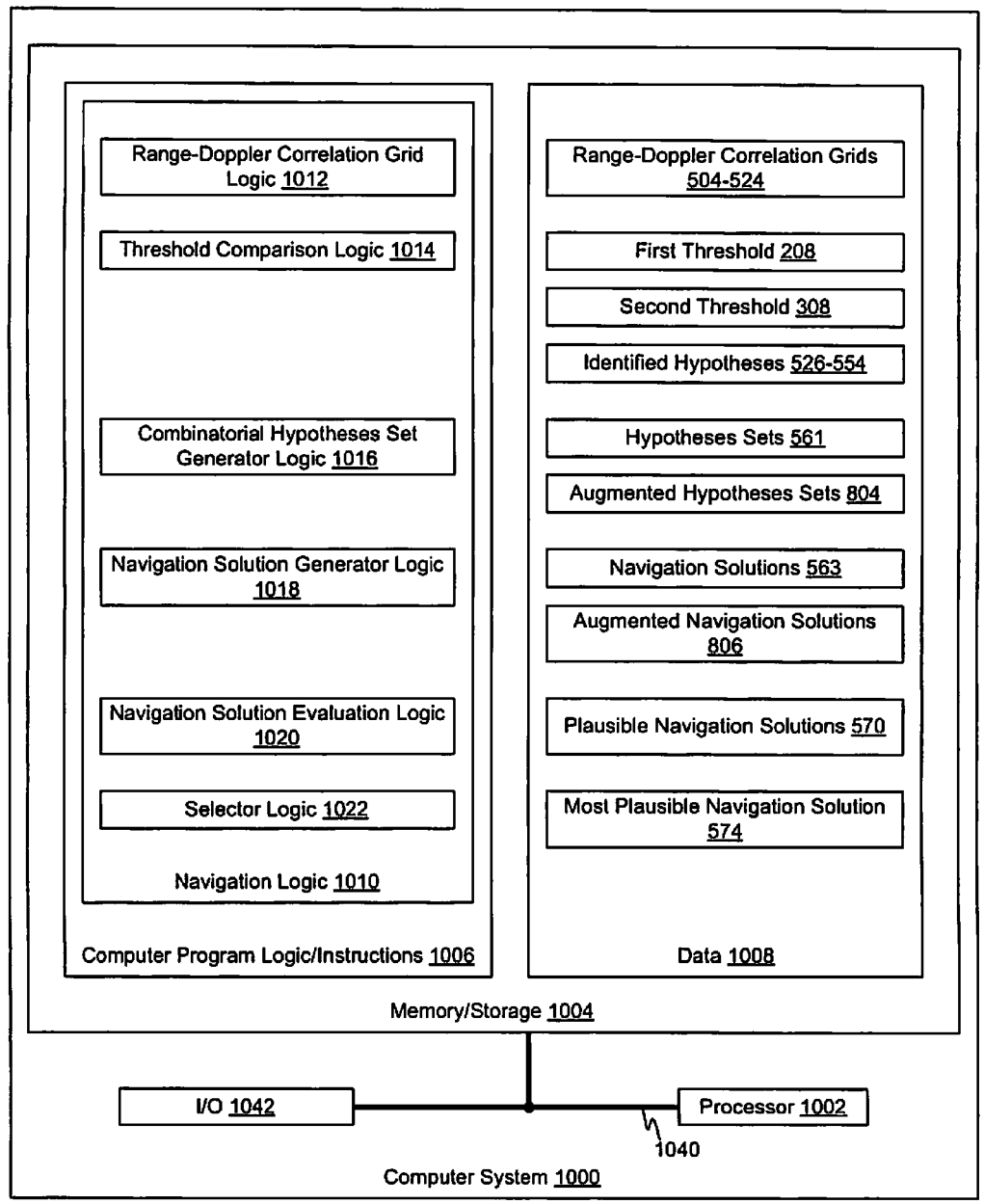
FIG. 10 is a block diagram of a computer system configured to detect navigation signals based on correlations amongst the navigation signals, and to compute a navigation solution from the detected navigation signals.

FIG. 10 is a block diagram of an example computer system 1000, configured to detect navigation signals based on correlations amongst the navigation signals, and to compute a navigation solution from the detected navigation signals.

Computer system 1000 includes one or more computer instruction processing units, illustrated here as a processor 1002, to execute computer program product logic, also known as instructions, code, and software.

Computer system 1000 further includes memory/storage 1004, including a computer readable medium having computer program product logic or instructions 1006 stored thereon, to cause processor 1002 to perform one or more functions in response thereto.

Memory/storage 1004 further includes data 1008 to be used by processor 1002 in executing instructions 1006, and/or generated by processor 1002 in response to execution of instructions 1006.

In the example of FIG. 10, logic 1006 includes navigation logic 1010 to cause processor 1002 to detect navigation signals and to compute a navigation solution from the detected navigation signals.

Logic 1010 includes range-Doppler correlation grid logic 1012 to cause processor 1002 to generate range-Doppler correlation grids, such as described above with respect to grids 504 through 524.

Logic 1010 further includes threshold comparison logic 1014 to cause processor 1002 to identify range-Doppler hypotheses that meet one or more thresholds, such as described above with respect to one or more of first threshold 208, second threshold 308, and identified hypotheses 524 trough 554.

Logic 1010 further includes combinatorial hypotheses set generator logic 1016 to cause processor 1002 to generate hypotheses sets, such as described above with respect to one or more of k-hypotheses sets 561 and augmented hypotheses sets 804.

Logic 1010 further includes navigation solution generator logic 1018 to cause processor 1002 to compute navigation solutions, such as described above with respect to one or more of navigation solutions 563 and augmented navigation solutions 806.

Combinatorial hypotheses set generator logic 1016 and navigation solution generator logic 1018 may be collectively referred to herein as combinatorial computation logic or computation logic.

Logic 1010 further includes navigation solution evaluation logic 1020 to cause processor 1002 to evaluate navigation solutions and to identify plausible navigation solutions, such as described above with respect to plausible navigation solutions 570.

Logic 1010 further includes selector logic 1022 to cause processor 1002 to select a most plausible navigation solution, such as described above with respect to selector 572.

Computer system 1000 may include a communications infrastructure 1040 to communicate amongst components of computer system 1000.

Computer system 1000 may include an input/output controller 1042 to communicate with one or more other systems.

Figure 11:
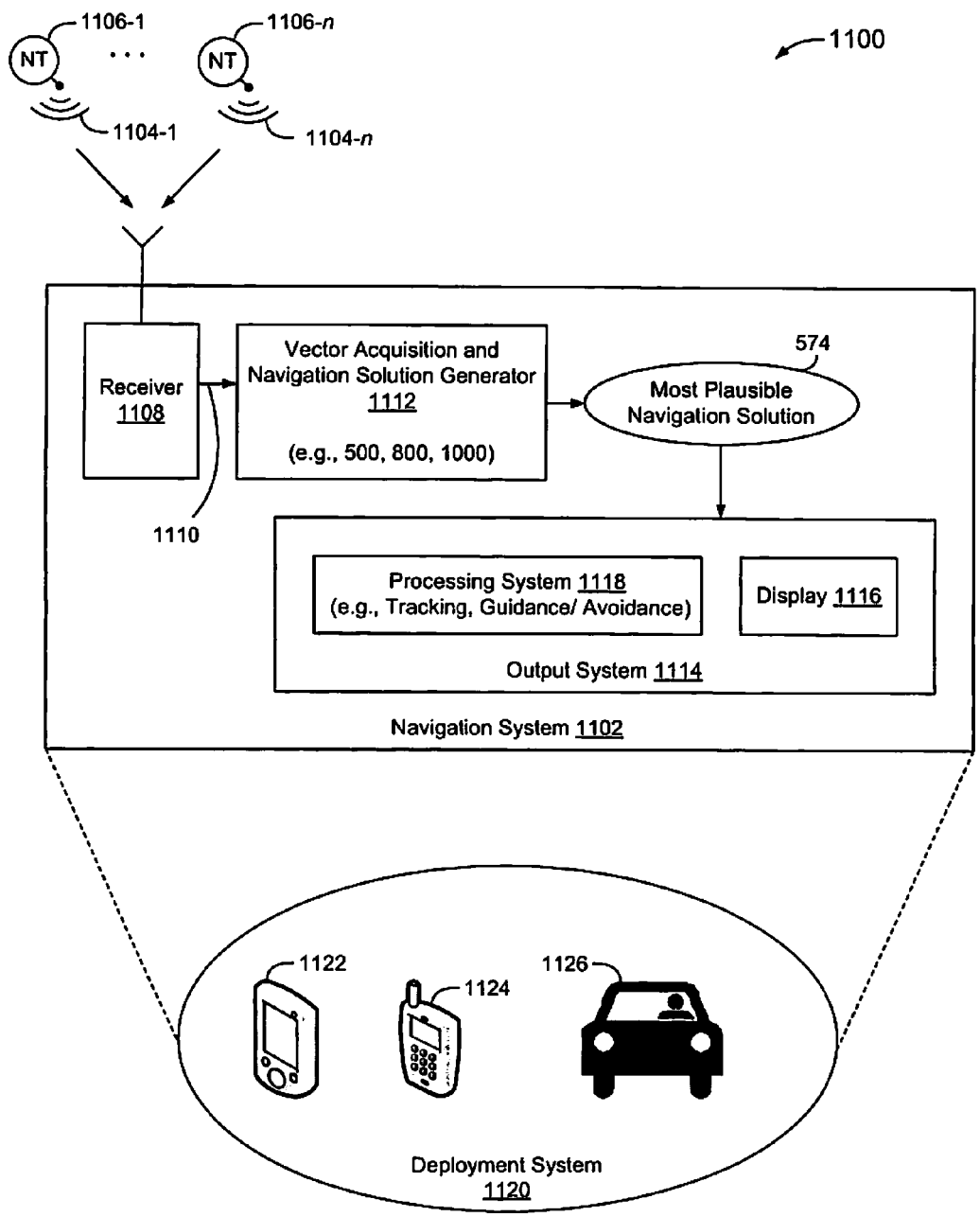
FIG. 11 is a block diagram of an example navigation environment, including a navigation system to receive navigation signals from multiple navigation signal transmitters.

FIG. 11 is a block diagram of an example navigation environment 1100, including a navigation system 1102 to receive navigation signals 1104-1 through 1104-n, from multiple navigation signal transmitters 1106-1 through 1106-n. Navigation signals transmitters 1106 may include satellite-based navigation signal transmitters and/or terrestrial navigation signal transmitters.

Navigation system 1102 includes a receiver 1108 to receive navigation signals 1104, perform one or more front-end processes on navigation signals 1104, and output corresponding information 1110 to a vector acquisition and navigation solution generator system 1112.

System 1112 may be configured to detect navigation signals 1104 based on correlations amongst the navigation signals, and to output a most plausible navigation solution 574, such as described in one or more examples above. System 1112 may include, for example, one or more of systems 500, 800, and 1000, portions thereof, and/or combinations thereof.

Navigation system 1104 may include an output system 1114 to receive most plausible navigation solution 574. Output system 1114 may include a display 1116 to display most plausible navigation solution 574. Alternatively, or additionally, output system 1114 may include a processing system 1118 to process multiple navigation solution 574. Processing system 1118 may include, for example, a tracking, guidance, and/or avoidance system to accumulate and process most plausible solutions 574 over time.

Output system 1114, or portions thereof, may be implemented remotely, and navigation system 1102 may include a transmitter to transmit most plausible navigation solution 574 to the remote portion of output system 1114.

Navigation system 1102, or portions thereof, may be implemented within a deployment system 1120, which may include, for example and without limitation, a hand-held GPS-based positioning device 1122, a mobile telephone 1124, and/or an automobile 1126 and/or other mobile platform.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A method, comprising:
generating a range-Doppler correlation grid for each of multiple navigation signals, wherein energy peaks of the range-Doppler correlation grids represent range-Doppler hypotheses corresponding to the navigation signals;
identifying range-Doppler hypotheses from j of the range-Doppler correlation grids for which corresponding energy levels meet a first threshold, wherein j is a positive integer;
computing, via processing circuitry of a navigation solution generator, a navigation solution from each of multiple sets of the identified range-Doppler hypotheses, wherein each set includes one identified range-Doppler hypothesis from each of a plurality of the j range-Doppler correlation grids;
evaluating the navigation solutions to identify one or more of the navigation solutions as plausible navigation solutions; and
selecting a most plausible navigation solution when multiple plausible navigation solutions are identified;
wherein the generating, the identifying, the computing, the evaluating, and the selecting are performed in a suitably programmed computer system.

2. The method of claim 1, wherein:
the computing includes computing navigation solutions for sets of k range-Doppler hypotheses, wherein k is a positive integer, and wherein j is equal to or greater than k; and the evaluating includes identifying one or more k-hypotheses-based plausible navigation solutions.

3. The method of claim 2, wherein j is greater than k, the method further including, prior to the selecting:
augmenting a set of k-hypotheses of a plausible navigation solution with an identified hypothesis of one of the j range-Doppler grids that is not represented in the set of k-hypotheses, computing an augmented navigation solution from the augmented set of hypotheses;
evaluating the augmented navigation solution;
comparing evaluation results of the augmented navigation solution with evaluation results of the plausible navigation solution; and
retaining one of the augmented navigation solution and the plausible navigation solution based on the comparison.

4. The method of claim 3, further including:
repeating the augmenting and the computing of an augmented navigation solution for one or more additional identified hypotheses of the range-Doppler grid;
wherein the evaluating of the augmented navigation solution includes evaluating the plurality of augmented navigation solutions;
wherein the comparing includes comparing evaluation results of the augmented navigation solutions with the evaluation results of the plausible navigation solution; and
wherein the retaining includes retaining one navigation solution from amongst the augmented navigation solutions and the plausible navigation solution based on the comparing.

5. The method of claim 1, wherein the identifying includes:
identifying a single range-Doppler hypothesis from a grid when the energy level of the range-Doppler hypothesis meets a second threshold that is greater than the first threshold.

6. The method of claim 1, wherein the first threshold is less than a per-navigation-signal false alarm threshold.

7. The method of claim 1, wherein the evaluating includes:
computing a test statistic for a navigation solution as a function of measurements of the navigation solution and navigation states of the navigation solution;
computing an expected value of the test statistic as a difference between a number of the measurements and a number of the states;
computing a standard deviation of the test statistic with respect to the expected value of the test statistic; and
computing an integrity of the navigation solution as a magnitude of a difference between the test statistic and the expected value of the test statistic, divided by the standard deviation.

8. A computer program product including a non-transitory computer readable storage medium having computer program logic stored therein, the computer program logic comprising:
grid logic to cause a processor to generate a range-Doppler correlation grid for each of multiple navigation signals, wherein energy peaks of the range-Doppler correlation grids represent range-Doppler hypotheses corresponding to the navigation signals;
threshold logic to cause the processor to identify range-Doppler hypotheses from j of the range-Doppler correlation grids for which corresponding energy levels meet a first threshold, wherein j is a positive integer;
computation logic to cause the processor to compute a navigation solution from each of multiple sets of the identified range-Doppler hypotheses, wherein each set includes one identified range-Doppler hypothesis from each of a plurality of the j range-Doppler correlation grids;
evaluation logic to cause the processor to evaluate the navigation solutions and to identify one or more of the navigation solutions as plausible navigation solutions; and
selector logic to cause the processor to select a most plausible navigation solution when multiple plausible navigation solutions are identified.

9. The computer program product of claim 8, wherein:
the computation logic includes logic to cause the processor to compute navigation solutions for sets of k range-Doppler hypotheses, wherein k is a positive integer, and wherein j is equal to or greater than k; and
the evaluation logic includes logic to cause the processor to identify one or more hypotheses- based plausible navigation solutions.

10. The computer program product of claim 9, wherein j is greater than k, and wherein:
the computation logic further includes logic to cause the processor to augment a set of k-hypotheses of a plausible navigation solution with an identified hypothesis of one of the j range-Doppler grids that is not represented in the set of k-hypotheses, and compute an augmented navigation solution from the augmented set of hypotheses; and
the evaluation logic further includes logic to cause the processor to evaluate the augmented navigation solution, compare evaluation results of the augmented navigation solution with evaluation results of the plausible navigation solution, and retain one of the augmented navigation solution and the plausible navigation solution based on the comparison.

11. The computer program product of claim 10, wherein:
the computation logic further includes logic to cause the processor to augment one or more additional identified hypotheses of the range-Doppler grid and to compute corresponding augmented navigation solutions;
the evaluation logic further includes logic to cause the processor to evaluate the plurality of augmented navigation solutions, to compare evaluation results of the augmented navigation solutions with the evaluation results of the plausible navigation solution, and to retain one navigation solution from amongst the augmented navigation solutions and the plausible navigation solution based on the comparisons.

12. The computer program product of claim 8, wherein the threshold logic includes:
logic to cause the processor to identify a single range-Doppler hypothesis from a grid when the energy level of the range-Doppler hypothesis meets a second threshold that is greater than the first threshold.

13. The computer program product of claim 8, wherein the first threshold is less than a per-navigation-signal false alarm threshold.

14. The computer program product of claim 8, wherein the evaluation logic includes:
logic to cause the processor to compute a test statistic for a navigation solution as a function of measurements of the navigation solution and navigation states of the navigation solution;
logic to cause the processor to compute an expected value of the test statistic as a difference between a number of the measurements and a number of the states;
logic to cause the processor to compute a standard deviation of the test statistic with respect to the expected value of the test statistic; and
logic to cause the processor to compute an integrity of the navigation solution as a magnitude of a difference between the test statistic and the expected value of the test statistic, divided by the standard deviation.

15. A system, comprising:
a grid generator to generate a range-Doppler correlation grid for each of multiple navigation signals, wherein energy peaks of the range-Doppler correlation grids represent range-Doppler hypotheses corresponding to the navigation signals;
a threshold detector to identify range-Doppler hypotheses from j of the range-Doppler correlation grids for which corresponding energy levels meet a first threshold, wherein j is a positive integer;
a computation system to compute a navigation solution from each of multiple sets of the identified range-Doppler hypotheses, wherein each set includes one identified range-Doppler hypothesis from each of a plurality of the j range-Doppler correlation grids;
an evaluation system to evaluate the navigation solutions and to identify one or more of the navigation solutions as plausible navigation solutions; and
a selector to select a most plausible navigation solution when multiple plausible navigation solutions are identified.

16. The system of claim 15, wherein:
the computation system is configured to compute navigation solutions for sets of k range-Doppler hypotheses, wherein k is a positive integer, and wherein j is equal to or greater than k; and
the evaluation system is configured to identify one or more k-hypotheses-based plausible navigation solutions.

17. The system of claim 16, wherein j is greater than k, and wherein:
the computation system is further configured to augment a set of k-hypotheses of a plausible navigation solution with an identified hypothesis of one of the j range-Doppler grids that is not represented in the set of k-hypotheses, and to compute an augmented navigation solution from the augmented set of hypotheses; and
the evaluation system is further configured to evaluate the augmented navigation solution, compare evaluation results of the augmented navigation solution with evaluation results of the plausible navigation solution, and retain one of the augmented navigation solution and the plausible navigation solution based on the comparison.

18. The system of claim 17, wherein:
the computation system is further configured to augment one or more additional identified hypotheses of the range-Doppler grid and to compute corresponding augmented navigation solutions; and
the evaluation system is further configured to evaluate the plurality of augmented navigation solutions, compare evaluation results of the augmented navigation solutions with the evaluation results of the plausible navigation solution, and
retain one navigation solution from amongst the augmented navigation solutions and the plausible navigation solution based on the comparisons.

19. The system of claim 15, wherein the threshold detector is configured to identify a single range-Doppler hypothesis from a grid when the energy level of the range-Doppler hypothesis meets a second threshold that is greater than the first threshold.

20. The system of claim 15, wherein the evaluation system includes:
a module to compute a test statistic for a navigation solution as a function of measurements of the navigation solution and navigation states of the navigation solution,
a module to compute an expected value of the test statistic as a difference between a number of the measurements and a number of the states,
a module to compute a standard deviation of the test statistic with respect to the expected value of the test statistic; and
a module to compute an integrity of the navigation solution as a magnitude of a difference between the test statistic and the expected value of the test statistic, divided by the standard deviation.

* * * * *